United States Patent
Kim et al.

(10) Patent No.: US 11,131,754 B2
(45) Date of Patent: *Sep. 28, 2021

(54) BEAM STEERING DEVICE INCLUDING A WAVEGUIDE, A CLADDING LAYER, AND AN ELECTRODE LAYER, AND SYSTEM INCLUDING THE SAME

(71) Applicant: SAMSUNG ELECTRONICS CO., LTD., Suwon-si (KR)

(72) Inventors: Sunil Kim, Osan-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,963

(22) Filed: Apr. 10, 2020

(65) Prior Publication Data
US 2020/0241381 A1    Jul. 30, 2020

Related U.S. Application Data

(63) Continuation of application No. 15/691,327, filed on Aug. 30, 2017, now Pat. No. 10,656,498.

(30) Foreign Application Priority Data

Nov. 11, 2016    (KR) .......................... 10-2016-0150335

(51) Int. Cl.
| | |
|---|---|
| *G01S 7/481* | (2006.01) |
| *G01S 17/89* | (2020.01) |
| *G01S 17/06* | (2006.01) |
| *G02F 1/295* | (2006.01) |

(52) U.S. Cl.
CPC ............ *G01S 7/4814* (2013.01); *G01S 17/06* (2013.01); *G01S 17/89* (2013.01); *G02F 1/295* (2013.01); *G02F 2203/24* (2013.01)

(58) Field of Classification Search
CPC .... G02F 1/295; G02F 2203/24; G02F 1/2955; G01S 17/89; G01S 7/4819; G01S 17/06
See application file for complete search history.

(56) References Cited

U.S. PATENT DOCUMENTS

| | | | |
|---|---|---|---|
| 4,729,620 A | 3/1988 | Pavlath | |
| 5,253,033 A | 10/1993 | Lipchak | |
| 5,544,268 A | 8/1996 | Bischel | |
| 8,570,645 B2 | 10/2013 | Pijlman et al. | |
| 9,104,086 B1 | 8/2015 | Davids et al. | |
| 9,366,938 B1 | 6/2016 | Anderson et al. | |
| 10,656,498 B2 * | 5/2020 | Kim ...................... G02F 1/295 |
| 2005/0265403 A1 | 12/2005 | Anderson | |
| 2010/0098424 A1 | 4/2010 | Ho | |

(Continued)

FOREIGN PATENT DOCUMENTS

| | | | |
|---|---|---|---|
| JP | 2012159584 | * | 8/2012 |
| JP | 2012-159584 A | | 8/2013 |

*Primary Examiner* — Jennifer D Bennett
(74) *Attorney, Agent, or Firm* — Sughrue Mion, PLLC (57) ABSTRACT

A beam steering device includes a waveguide configured to transmit a beam therethrough; a cladding layer provided on the waveguide and including a material having a refractive index that varies according to a voltage applied thereto; and an electrode layer including at least two electrodes configured to independently voltages to at least two portions of the cladding layer.

18 Claims, 6 Drawing Sheets

(56) References Cited

U.S. PATENT DOCUMENTS

2013/0034323 A1 2/2013 Costache
2014/0023105 A1 1/2014 Mikhailov et al.
2016/0227086 A1 8/2016 Miller et al.
2017/0091536 A1 3/2017 Uyeno

* cited by examiner

BEAM STEERING DEVICE INCLUDING A WAVEGUIDE, A CLADDING LAYER, AND AN ELECTRODE LAYER, AND SYSTEM INCLUDING THE SAME

CROSS-REFERENCE TO RELATED APPLICATION

This application is a continuation of U.S. application Ser. No. 15/691,327, filed Aug. 30, 2017, claims priority from Korean Patent Application No. 10-2016-0150335, filed on Nov. 11, 2016 in the Korean Intellectual Property Office, the disclosure of which are incorporated herein in their entireties by reference.

BACKGROUND

1. Field

Methods and apparatuses consistent with exemplary embodiments relate to beam steering devices and systems including the same.

2. Description of the Related Art

Examples of a method of steering a laser beam to a desired position include a method of mechanically rotating a portion to which a laser beam is emitted and an optical phased array (OPA) method using interference between a bundle of laser beams output from a plurality of waveguides or a plurality of unit cells. The OPA method may steer a laser beam by electrically or thermally controlling the waveguides or the unit cells. Since the method of mechanically rotating the portion to which a laser beam is emitted uses a motor or a microelectromechanical system (MEMS), a volume may be large and costs may be high. Since the OPA method uses the plurality of waveguides, an overall volume may be large and an error may occur when a phase is modulated.

SUMMARY

Exemplary embodiments may provide beam steering devices having simple structures.

Exemplary embodiments may further provide systems including beam steering devices having simple structures.

According to an aspect of an exemplary embodiment, there is provided a beam steering device including: a waveguide configured to transmit a beam therethrough; a cladding layer provided on the waveguide and including a material having a refractive index that varies according to a voltage applied thereto; and an electrode layer including at least two electrodes configured to independently apply voltages to at least two portions of the cladding layer.

The at least two electrodes may be electrically independent.

The cladding layer may include an electro-optic material.

The electro-optic material may include a liquid crystal, TiN, $KTa_{1-x}Nb_xO_3$ (KTN), or $NbO_x$.

The cladding layer may include an oxide semiconductor.

The oxide semiconductor may include at least one from among Indium-Tin-Oxide (ITO), Indium-Zinc-Oxide (IZO), Ga—In—Zn-Oxide (GIZO), Al—Zn-Oxide (AZO), Ga—Zn-Oxide (GZO), and ZnO.

The waveguide may include silicon or silicon nitride.

The waveguide may be configured to operate as an electrode.

The at least two electrodes of the electrode layer may include a plurality of pixel electrodes that are arranged in a matrix and are electrically independent.

The electrode layer may include a first portion configured to apply a first voltage to a first portion of the cladding layer and a second portion configured to apply a second voltage to a second portion of the cladding layer.

The cladding layer may include a metal oxide semiconductor structure provided along a surface of the electrode layer.

The cladding layer may include a first layer and a second layer, wherein the first layer may include at least one from among Indium-Tin-Oxide (ITO), Indium-Zinc-Oxide (IZO), Ga—In—Zn-Oxide (GIZO), Al—Zn-Oxide (AZO), Ga—Zn-Oxide (GZO), and ZnO and the second layer may include any one from among $HfO_2$, $Al_2O_3$, $SiN_x$, and $SiO_2$.

The waveguide, the cladding layer, and the electrode layer may be repeatedly stacked two or more times.

The waveguide may be configured to operate as an active prism according to a change in the refractive index of the cladding layer.

According to an aspect of another exemplary embodiment, there is provided a system including: a light source; a beam steering device configured to steer a beam incident from the light source towards an object; and a detector configured to detect the beam steered by the beam steering device and reflected by the object, wherein the beam steering device includes: a waveguide configured to transmit the beam therethrough; a cladding layer provided on the waveguide and including a material having a refractive index that varies according to a voltage applied thereto; and an electrode layer comprising at least two electrodes configured to independently apply voltages to at least two portions of the cladding layer.

The cladding layer may include an electro-optic material.

The electro-optic material may include a liquid crystal, TiN, $KTa_{1-x}Nb_xO_3$ (KTN), or $NbO_x$.

The cladding layer may include an oxide semiconductor.

The at least two electrodes of the electrode layer may include a plurality of pixel electrodes that are arranged in a matrix and are electrically independent.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Certain exemplary embodiments will now be described more fully with reference to the accompanying drawings. In the drawings, the same reference numerals denote the same elements and sizes of elements may be exaggerated for clarity and convenience of explanation. It will be understood that, although the terms first, second, etc. may be used herein to describe various elements, these elements should not be limited by these terms. These terms are only used to distinguish one element from another.

As used herein, the singular forms "a", "an", and "the" are intended to include the plural forms as well, unless the context clearly indicates otherwise. It will be further understood that the terms "comprises" and/or "comprising" used herein specify the presence of stated components, but do not preclude the presence or addition of one or more other components. Sizes or thicknesses of elements in the drawings may be exaggerated for clarity of explanation. Also, it will be understood that when a material layer is referred to as being "formed on" a substrate or another layer, the material layer may be directly or indirectly formed on the substrate or the other layer. That is, for example, intervening layers may be present. A material of each layer in the following exemplary embodiments is exemplary and other materials may be used.

Expressions such as "at least one of," when preceding a list of elements, modify the entire list of elements and do not modify the individual elements of the list.

Figure 1:
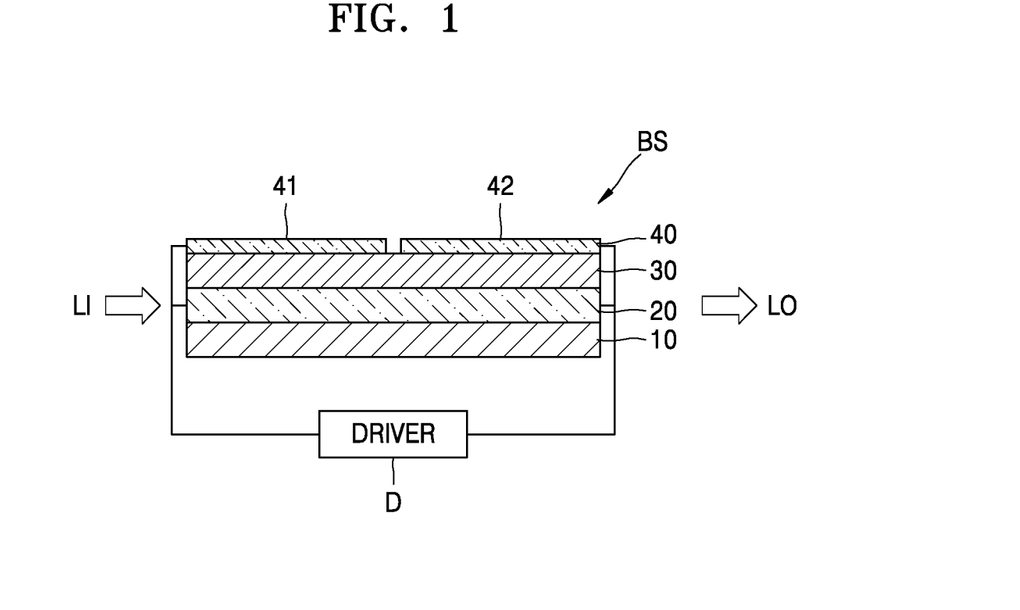
FIG. 1 is a cross-sectional view of a beam steering device according to an exemplary embodiment.
Figure 2:
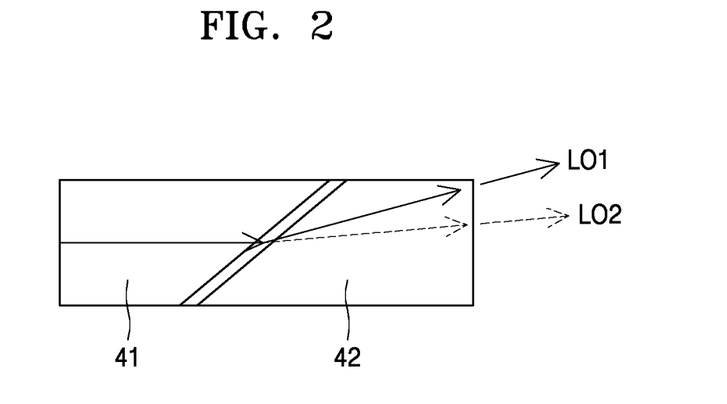
FIG. 2 is a plan view of FIG. 1.

FIG. 1 is a cross-sectional view of a beam steering device BS according to an exemplary embodiment. FIG. 2 is a plan view of the beam steering device BS of FIG. 1.

Referring to FIGS. 1 and 2, the beam steering device BS may include a waveguide 20 provided on a substrate 10, a cladding layer 30 provided on the waveguide 20, and an electrode layer 40. The beam steering device BS may further include a driver D that drives the beam steering device BS.

The substrate 10 may be, for example, a silicon substrate. However, exemplary embodiments are not limited thereto, and the substrate 10 may include any of various other materials. The waveguide 20 may be provided on a top surface of the substrate 10.

A beam passing through the waveguide 20 may be totally reflected within the waveguide 20. A beam may be incident on one side surface of the waveguide 20 and may be emitted through the opposite surface of the waveguide 20. The beam may be a laser beam or a beam emitted from a light-emitting device. The beam incident on the waveguide 20 is denoted by LI and the beam emitted from the waveguide 20 is denoted by LO. The waveguide 20 may include, for example, silicon or silicon nitride. However, exemplary embodiments are not limited thereto, and the waveguide 20 may be formed of a material whose refractive index is higher than that of the cladding layer 30.

The cladding layer 30 may include a material whose refractive index varies according to an electrical signal applied to the cladding layer 30. The cladding layer 30 may include an electro-optic material. For example, the cladding layer 30 may include a liquid crystal, TiN, $KTa_{1-x}Nb_xO_3$ (KTN), or $NbO_x$.

The cladding layer 30 may include, for example, an oxide semiconductor. The cladding layer 30 may include a transparent conductive oxide (TCO) whose refractive index varies according to an electrical signal applied to the cladding layer 30. The TCO may include at least one from among, for example, Indium-Tin-Oxide (ITO), Indium-Zinc-Oxide (IZO), Ga—In—Zn-Oxide (GIZO), Al—Zn-Oxide (AZO), Ga—Zn-Oxide (GZO), and ZnO, although exemplary embodiments are not limited thereto. The cladding layer 30 may have a p-n junction structure along with the waveguide 20.

The electrode layer 40 may be provided on the cladding layer 30. The electrode layer 40 may function as an electrode for applying a voltage to the cladding layer 30 and may include at least two electrodes that may be independently driven. For example, the electrode layer 40 may include a first electrode 41 and a second electrode 42 that are separate from each other. The electrode layer 40 may include at least one selected from the group consisting of, for example, titanium (Ti), gold (Au), silver (Ag), platinum (Pt), copper (Cu), aluminum (Al), nickel (Ni), and chromium (Cr). However, exemplary embodiments are not limited thereto, and the electrode layer 40 may include, for example, heavily doped n++ Si or low resistance ITO. The waveguide 20 may operate as a common electrode of the first electrode 41 and the second electrode 42.

The first electrode 41 and the second electrode 42 may be provided in various ways. For example, surfaces of the first electrode 41 and the second electrode 42 facing each other may be inclined as shown in FIG. 2. The first electrode 41 and the second electrode 42 may be separate from each other, and an insulating material may be further provided between the first electrode 41 and the second electrode 42. Also, although the electrode layer 40 of the beam steering device BS of FIGS. 1 and 2 is exemplarily shown as including two electrodes, the electrode layer 40 may include three or more electrodes.

When a voltage is applied to the cladding layer 30, a carrier density in the cladding layer 30 at an interface between the cladding layer 30 and the waveguide 20 is changed and thus a refractive index of the cladding layer 30 is changed. Once the refractive index of the cladding layer 30 is changed, the waveguide 20 adjacent to the cladding layer 30 is affected and an effective refractive index of the waveguide 20 is also changed, which will be explained below.

Examples of a method of changing a refractive index of a waveguide include a method using heat and a method using electricity. In the method using heat, although a phase change is large and the waveguide may be formed of any of various materials, a speed is low, waveguides have to be spaced apart by a predetermined interval or more due to severe interference between the waveguides, and it is difficult to achieve a wide field of view (FOV). Also, in the method using electricity, although a speed is high and a wide FOV is achieved due to no interference between waveguides, a long waveguide is required due to a small phase change, a waveguide material is limited to a semiconductor material such as silicon (Si) due to the use of a p-n or p-i-n junction structure, and it is difficult to steer laser beams of various wavelengths.

In contrast, the beam steering device BS of the present exemplary embodiment may change an effective refractive index of the waveguide 20 by using the cladding layer 30 whose refractive index varies according to an electrical signal applied to the cladding layer 30 around the waveguide 20. In the present exemplary embodiment, a beam passing through the waveguide 20 may respond to a change in a refractive index by changing a refractive index of the cladding layer 30 provided around the waveguide 20 without changing a refractive index of the waveguide 20 itself. Accordingly, since a refractive index of the waveguide 20 itself is not changed, beam loss may be small. Also, since any of various materials such as silicon or silicon nitride is used as a material of the waveguide 20, beams of various wavelengths may be steered. Also, since an electrical signal, instead of heat, is used, a speed may be high and a wide FOV may be achieved.

Figure 3A:
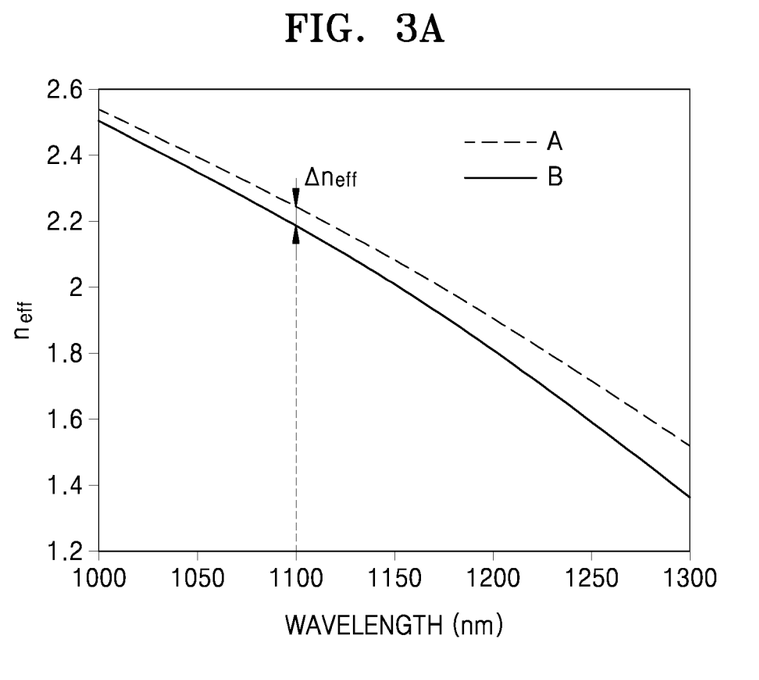
FIG. 3A is a graph showing a relationship between a wavelength and an effective refractive index of a waveguide when a laser beam passes through a cladding layer of the beam steering device of FIG. 1 (in a TM0 mode)

FIG. 3A is a graph showing a relationship between a wavelength and an effective refractive index $n_{\mathit{eff}}$ of the waveguide 20 when a laser beam passes through the beam steering device BS of FIG. 1 (in a TM0 mode). The term 'TM mode' refers to a transverse magnetic mode of an electromagnetic field in a waveguide when a magnetic field is formed in a direction perpendicular to a propagation direction of an electromagnetic wave. The TM0 mode is a TM mode whose mode number is 0.

Figure 3B:
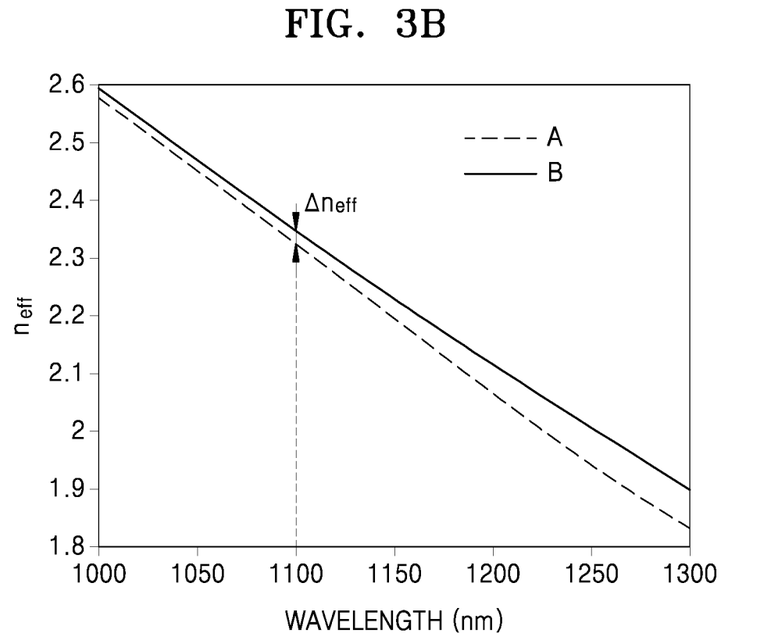
FIG. 3B is a graph showing a relationship between a wavelength and an effective refractive index of the waveguide when a laser beam passes through the cladding layer of the beam steering device of FIG. 1 (in a TE0 mode)

FIG. 3B is a graph showing a relationship between a wavelength and an effective refractive index $n_{\mathit{eff}}$ of the waveguide 20 when a laser beam passes through the beam steering device BS of FIG. 1 (in a TE0 mode). The term 'TE mode' refers to a transverse electric mode of an electromagnetic field in a waveguide when an electric field is formed in a direction perpendicular to a propagation direction of an electromagnetic wave. The TE0 mode is a TE mode whose mode number is 0.

In FIGS. 3A and 3B, the waveguide 20 was formed of silicon and the cladding layer 30 was formed of ITO. The term 'effective refractive index $n_{\mathit{eff}}$' refers to a refractive index of the waveguide 20 sensed by a laser beam passing through the waveguide 20 when a voltage was applied to the cladding layer 30 and a refractive index of the cladding layer 30 was changed whereas a refractive index of the waveguide 20 was not changed. "A" indicates a case where a voltage was not applied to the cladding layer 30 and "B" indicates a case where a voltage of 4 V was applied to the cladding layer 30.

Referring to FIGS. 3A and 3B, an effective refractive index change $\Delta n_{\mathit{eff}}$ at a wavelength of 1100 nm was about 0.033 in the TM0 mode and was about 0.0122 in the TE0 mode. The term 'effective refractive index change $\Delta n_{\mathit{eff}}$' refers to a difference between an effective refractive index of the waveguide 20 when a voltage was not applied to the cladding layer 30 and an effective refractive index of the waveguide 20 when a voltage of 4 V was applied to the cladding layer 30. As such, an effective refractive index of the waveguide 20 may be changed according to a voltage applied to the cladding layer 30. When different voltages are applied to the first electrode 41 and the second electrode 42, a portion of the cladding layer 30 corresponding to the first electrode 41 and a portion of the cladding layer 30 corresponding to the second electrode 42 may have different refractive indices. Effective refractive indices of the waveguide 20 corresponding to the portions of the cladding layer 30 may be changed according to the different refractive indices. Hence, when a beam passes through two portions having different effective refractive indices of the waveguide 20, the beam may be refracted and a propagation path of the beam may be changed. A refraction angle of a beam passing through the waveguide 20 may be changed according to a difference between voltages respectively applied to the first electrode 41 and the second electrode 42, and thus the beam may be steered. Since the waveguide 20 functions as a common electrode in the beam steering device BS of FIG. 1, a first voltage may be applied between the waveguide 20 and the first electrode 41 and a second voltage may be applied between the waveguide 20 and the second electrode 42.

For example, directions of a first output beam LO1 and a second output beam LO2 may vary according to a difference between the first voltage and the second voltage as shown in FIG. 2.

Figure 4:
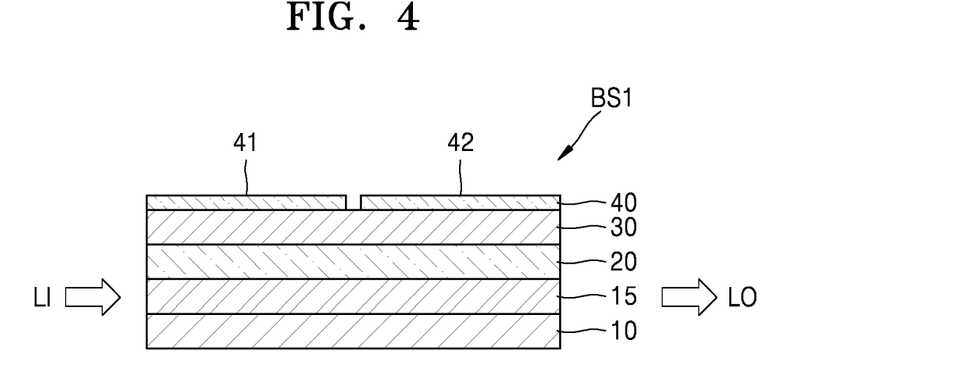
FIG. 4 is a cross-sectional view illustrating an example where a lower electrode layer is further provided in the beam steering device of FIG. 1.

FIG. 4 is a cross-sectional view of a beam steering device BS1 according to another exemplary embodiment. The beam steering device BS1 is different from the beam steering device BS of FIG. 1 in that an electrode 15 is further provided. The beam steering device BS of FIG. 1 is configured so that the waveguide 20 functions as an electrode whereas the beam steering device BS1 includes the electrode 15 between the substrate 10 and the waveguide 20. The electrode 15 may include at least one selected from the group consisting of, for example, Ti, Au, Ag, Pt, Cu, Al, Ni, and Cr.

Figure 5:
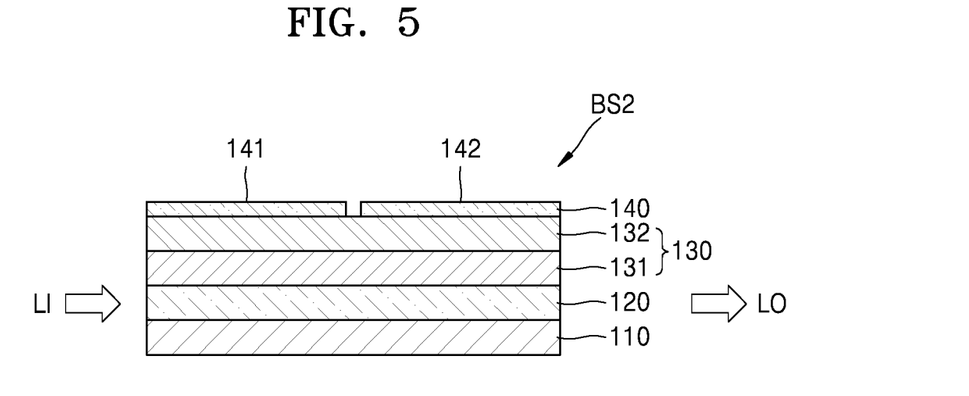
FIG. 5 is a cross-sectional view of a beam steering device according to another exemplary embodiment.

FIG. 5 is a cross-sectional view of a beam steering device BS2 according to another exemplary embodiment. The beam steering device BS2 may include a waveguide 120 provided on a substrate 110, a cladding layer 130 provided on the waveguide 120, and an electrode layer 140.

The substrate 110 may be, for example, a silicon substrate. However, exemplary embodiments are not limited thereto, and the substrate 110 may include any of various other materials. The waveguide 120 may be provided on a top surface of the substrate 110.

A beam passing through the waveguide 120 may be totally reflected within the waveguide 120. The waveguide 120 may include, for example, silicon or silicon nitride. However, exemplary embodiments are not limited thereto, and the waveguide 120 may be formed of a material whose refractive index is higher than that of the cladding layer 130.

The cladding layer 130 may include a first layer 131 and a second layer 132. The first layer 131 may include at least one from among ITO, IZO, GIZO, AZO, GZO, and ZnO. The second layer 132 may include at least one from among $HfO_2$, $Al_2O_3$, $SiN_x$, and $SiO_2$. A refractive index of the first layer 131 may vary according to an electrical signal applied to the first layer 131. The cladding layer 130 may have a metal oxide semiconductor (MOS) structure along with the electrode layer 140.

The electrode layer 140 may include a first electrode 141 and a second electrode 142. Each of the first electrode 141 and the second electrode 142 may include at least one selected from the group consisting of Ti, Au, Ag, Pt, Cu, Al, Ni, and Cr. However, exemplary embodiments are not limited thereto, and each of the first electrode 141 and the second electrode 142 may include, for example, heavily doped n++ Si or low resistance ITO. The waveguide 120 may operate as a common electrode of the first electrode 141 and the second electrode 142. The first electrode 141 and the second electrode 142 may be provided in various ways as long as the first electrode 141 and the second electrode 142 are electrically independently driven. For example, the first electrode 141 and the second electrode 142 may be physically separate from each other, or may be provided in other ways.

When different voltages are applied to the first electrode 141 and the second electrode 142, a portion of the cladding layer 130 corresponding to the first electrode 141 and a portion of the cladding layer 130 corresponding to the second electrode 142 may have different refractive indices. Effective refractive indices of the waveguide 120 corresponding to the portions of the cladding layer 130 may be changed according to the different refractive indices. Hence, when a beam passes through two portions having different effective refractive indices of the waveguide 120, the beam may be refracted and a propagation of the beam may be changed. A refraction angle of a beam passing through the waveguide 120 may be changed according to a difference between voltages respectively applied to the first electrode 141 and the second electrode 142 and thus the beam may be steered. Since the waveguide 120 functions as a common electrode in the beam steering device BS2, a first voltage may be applied between the waveguide 120 and the first electrode 141 and a second voltage may be applied between the waveguide 120 and the second electrode 142. Directions of a beam LO output through the waveguide 120 may vary according to a difference between the first voltage and the second voltage.

Figure 6:
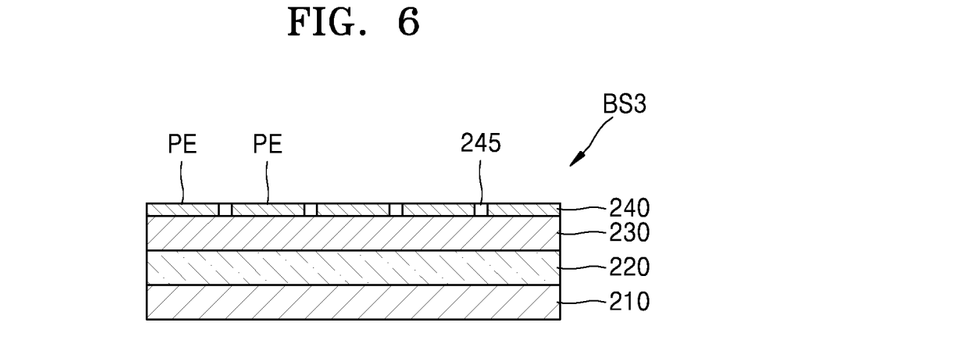
FIG. 6 is a cross-sectional view of a beam steering device according to another exemplary embodiment.
Figure 7:
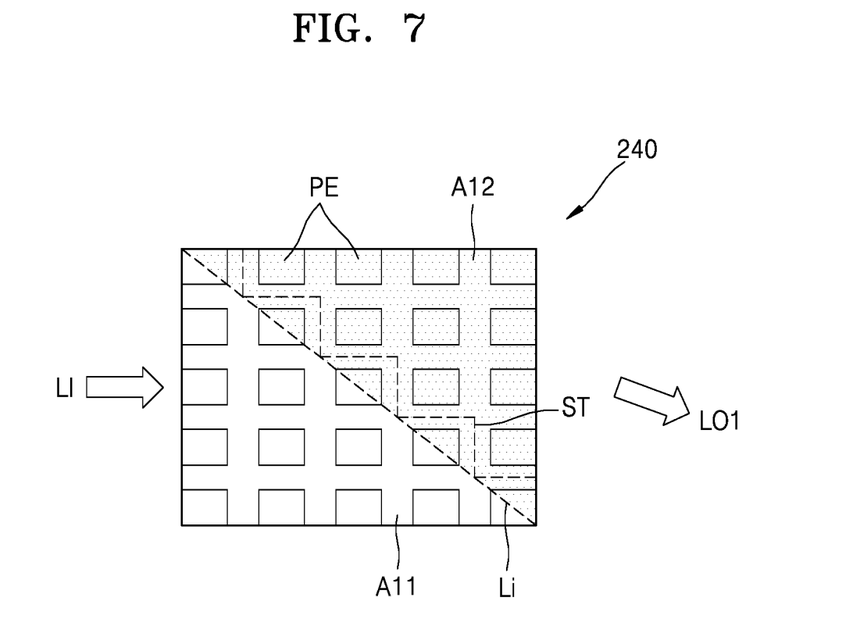
FIG. 7 is a plan view of FIG. 6.

FIG. 6 is a cross-sectional view of a beam steering device BS3 according to another exemplary embodiment. FIG. 7 is a plan view of the beam steering device BS3 of FIG. 6.

The beam steering device BS3 may include a waveguide 220 provided on a substrate 210, a cladding layer 230 and an electrode layer 240 provided on the waveguide 220.

The substrate 210 may be, for example, a silicon substrate. However, exemplary embodiments are not limited thereto, and the substrate 210 may include any of various other materials. The waveguide 220 may be provided on a top surface of the substrate 210.

A beam passing through the waveguide 220 may be totally reflected within the waveguide 220. The waveguide 220 may include, for example, silicon or silicon nitride. The cladding layer 230 may include a material whose refractive index varies according to an electrical signal applied to the cladding layer 230. The cladding layer 230 may include an electro-optic material. For example, the cladding layer 230 may include a liquid crystal, TiN, KTN, or $NbO_x$.

Alternatively, the cladding layer 230 may include an oxide semiconductor. The cladding layer 230 may include a TCO whose refractive index varies according to an electrical signal applied to the cladding layer 230. The TCO may include at least one from among, for example, ITO, IZO, GIZO, AZO, GZO, and ZnO. The cladding layer 230 may have a p-n junction structure along the waveguide 220. Alternatively, the cladding layer 230 may have a metal oxide semiconductor structure along the electrode layer 240. The metal oxide semiconductor structure may be the same as that described with reference to FIG. 5, and thus a detailed explanation thereof will not be given.

The electrode layer 240 may include a plurality of pixel electrodes PE that are arranged in a matrix to be electrically independent. An insulating material 245 may be provided between the pixel electrodes PE. The electrode layer 240 may include at least one selected from the group consisting of Ti, Au, Ag, Pt, Cu, Al, Ni, and Cr. However, exemplary embodiments are not limited thereto, and the electrode layer 240 may include, for example, heavily doped n++ Si or low resistance ITO. The waveguide 220 may operate as a common electrode. Alternatively, a separate common electrode may be additionally provided.

The pixel electrodes PE may be independently driven. For example, the electrode layer 240 may be divided into a first portion A11 and a second portion A12, and a first voltage may be applied to the pixel electrodes PE in the first portion A11 and a second voltage may be applied to the pixel electrodes PE in the second portion A12. In FIG. 7, a boundary between the first portion A11 and the second portion A12 has a stepped shape ST according to shapes of the pixel electrodes PE. However, FIG. 7 is an exaggerated illustration of certain features, and since the pixel electrodes PE are actually very small, a boundary between the first portion A11 and the second portion A12 may be substantially a linear line Li.

When the first voltage is applied to the pixel electrodes PE in the first portion A11, a portion of the cladding layer 230 corresponding to the first portion A11 may have a first refractive index, and when the second voltage is applied to the pixel electrodes PE in the second portion A12, a portion of the cladding layer 230 corresponding to the second portion A12 may have a second refractive index. An effective refractive index difference occurs in the waveguide 220 according to a difference between the first refractive index and the second refractive index, and a refraction angle of a beam passing through the waveguide 220 may be controlled according to the effective refractive index difference, thereby making it possible to control a direction in which the beam is output.

Figure 8:
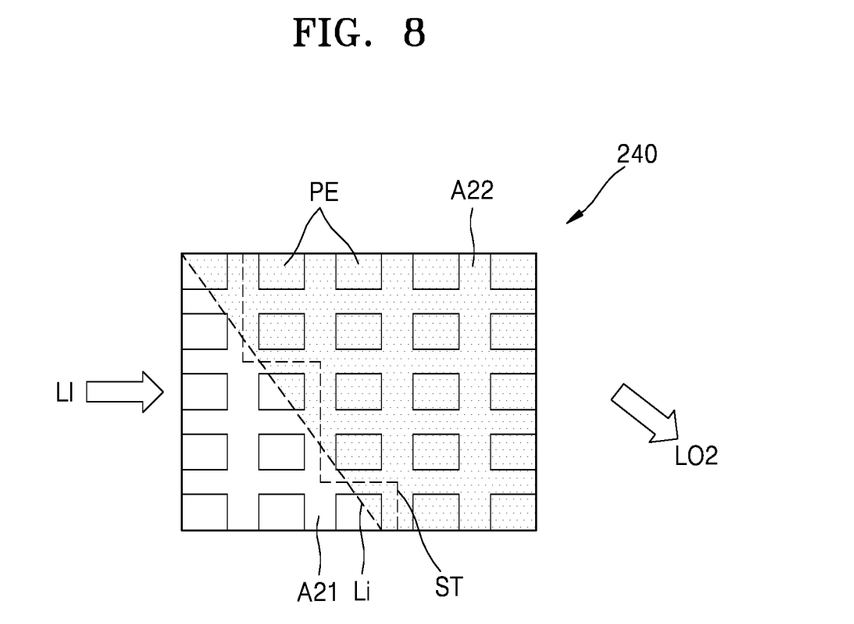
FIG. 8 is a plan view for explaining refractive index change portions due to pixel electrodes of the beam steering device of FIG. 6.

FIG. 8 is a plan view illustrating an example where a first portion A21 to which a first voltage is applied and a second portion A22 to which a second voltage is applied are changed. A gradient of a boundary between the first portion A21 and the second portion A22 is different from that in FIG. 7. Portions to which the first voltage and the second voltage are applied may be changed by selectively driving the plurality of pixel electrodes PE. Hence, a refraction direction of a beam passing through the waveguide 220 may be controlled. For example, a beam LO1 output through the waveguide 220 in FIG. 7 may be more refracted and output than a beam LO2 output through the waveguide 220 in FIG. 8.

In FIG. 7, a refractive index of a cladding portion corresponding to the first portion A11 and a refractive index of a cladding portion corresponding to the second portion A12 may be changed by changing a voltage applied to the pixel electrodes PE in the first portion A11 and a voltage applied to the pixel electrodes PE in the second portion A12 while maintaining the first portion A11 and the second portion A12. Accordingly, a beam may be steered due to a difference between the refractive indices.

In FIG. 7, a beam may be steered by adjusting a direction which the beam is output by adjusting at least one from among a first voltage, a second voltage, a portion to which the first voltage is applied, and a portion to which the second voltage is applied.

Figure 9:
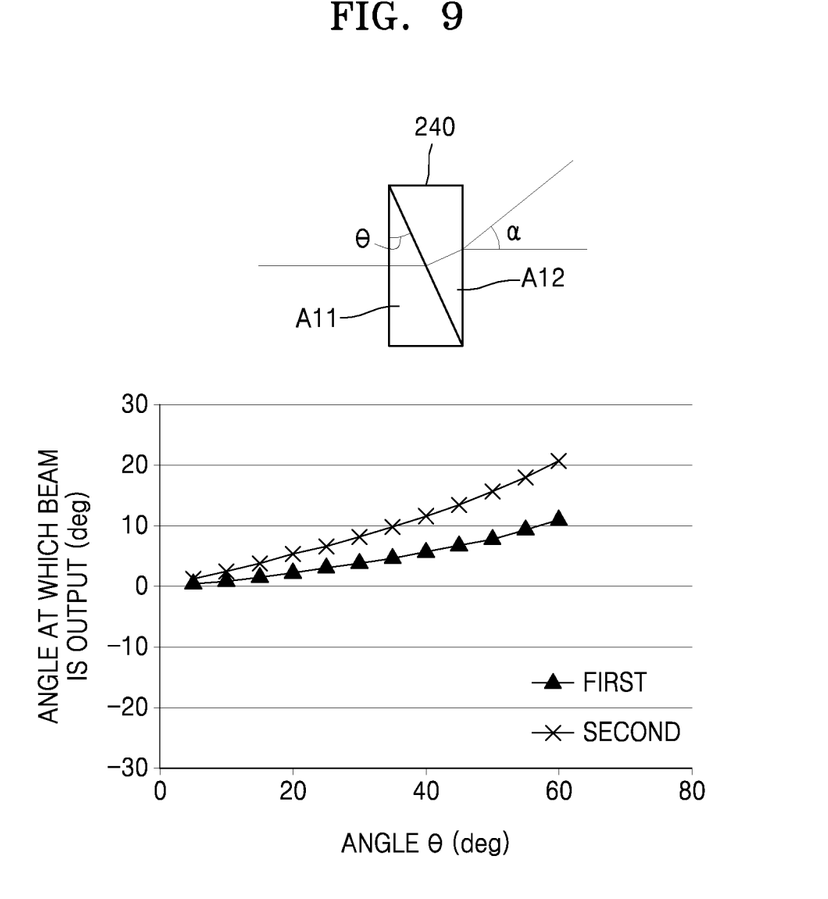
FIG. 9 is a graph showing a relationship between an angle at which a beam is output and a gradient θ of a boundary between refractive index change portions of the beam steering device of FIG. 6.

FIG. 9 is a graph showing a relationship between an angle α at which a beam is output and a gradient θ of a boundary between the first portion A11 and the second portion A12 of the electrode layer 240. The angle α refers to a gradient of an emitted beam with respect to a normal line of an emission surface of the waveguide 220. As shown in FIG. 9, the angle α may be adjusted according to the gradient θ of the boundary between the first portion A11 and the second portion A12 of the electrode layer 240.

Figure 10:
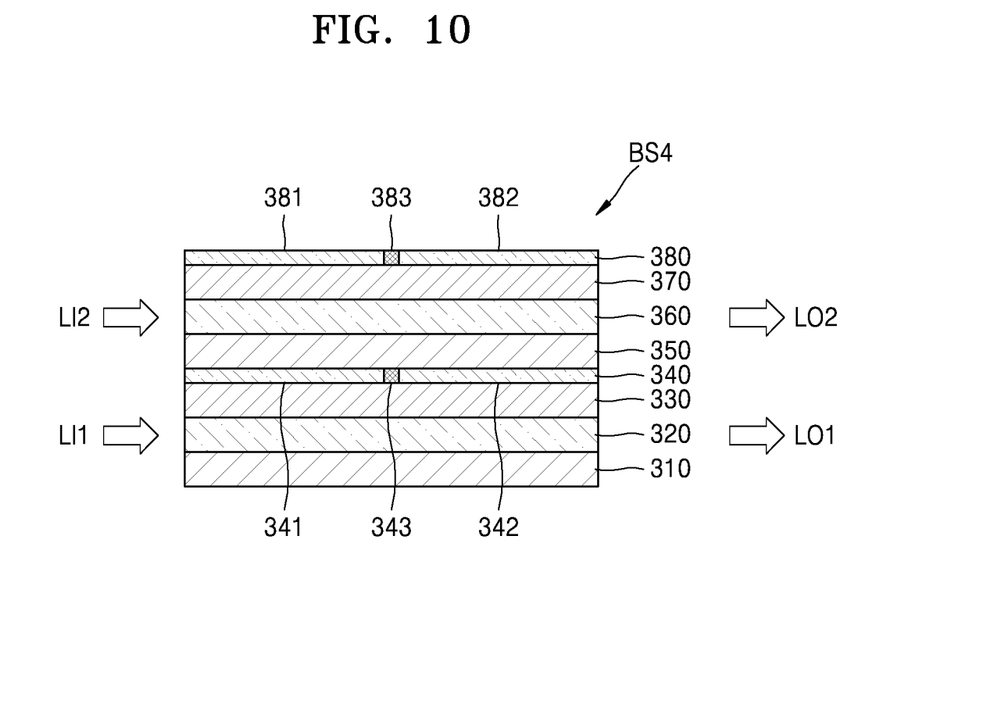
FIG. 10 is a cross-sectional view of a beam steering device according to another exemplary embodiment.

FIG. 10 is a cross-sectional view of a beam steering device BS4 according to another exemplary embodiment.

The beam steering device BS4 may have a stacked structure including a first waveguide 320 provided on a first substrate 310, a first cladding layer 330 provided on the first waveguide 320, and a first electrode layer 340, and the stacked structure may be repeatedly stacked two or more times.

For example, a second substrate 350, a second waveguide 360, a second cladding layer 370, and a second electrode layer 380 may be stacked on the first electrode layer 340. Also, the second waveguide 360 may be directly stacked on the first electrode layer 340 without the second substrate 350 therebetween.

The first electrode layer 340 may include at least two electrodes, and the second electrode layer 380 may include at least two electrodes. The first electrode layer 340 may include, for example, a first electrode 341 and a second electrode 342. An insulating material 343 may be provided between the first electrode 341 and the second electrode 342. The second electrode layer 380 may include a third electrode 381 and a fourth electrode 382. An insulating material 383 may be provided between the third electrode 381 and the fourth electrode 382. Alternatively, the first electrode layer 340 may include a plurality of pixel electrodes and the second electrode layer 380 may include a plurality of pixel electrodes.

In the present exemplary embodiment, beam steering may be performed at different heights by using a stacked structure. A first incident beam LI1 may be output as a first emitted beam LO1 through the first waveguide 320, and the first emitted beam LO1 may be steered in a direction perpendicular to the ground due to a difference between voltages respectively applied to the first electrode 341 and the second electrode 342. A second incident beam LI2 may be output as a second emitted beam LO2 through the second waveguide 360, and the second emitted beam LO2 may be steered in a direction perpendicular to the ground due to a difference between voltages respectively applied to the third electrode 381 and the fourth electrode 382. The first emitted beam LO1 and the second emitted beam LO2 are emitted at different heights. Hence, beams may be steered in various directions at various heights by using a stacked structure.

As described in the above exemplary embodiments, a beam steering device may include a cladding layer whose refractive index varies according to an electrical signal and at least two independent electrodes that may emit different voltages so that a waveguide operates as an active prism. Accordingly, the beam steering device may simply steer a beam by using an electrical control method.

In the above exemplary embodiments, since a refractive index of a waveguide itself is not changed, beam loss may be small. Since various materials such as silicon or silicon nitride may be used as a material of the waveguide, laser beams of various wavelengths may be steered. Also, since an electrical signal, instead of heat, is used, a beam steering speed may be high and a wide FOV may be achieved. Also, since a light transmission method, instead of an OPA method, is used, light efficiency may be high.

Figure 11:
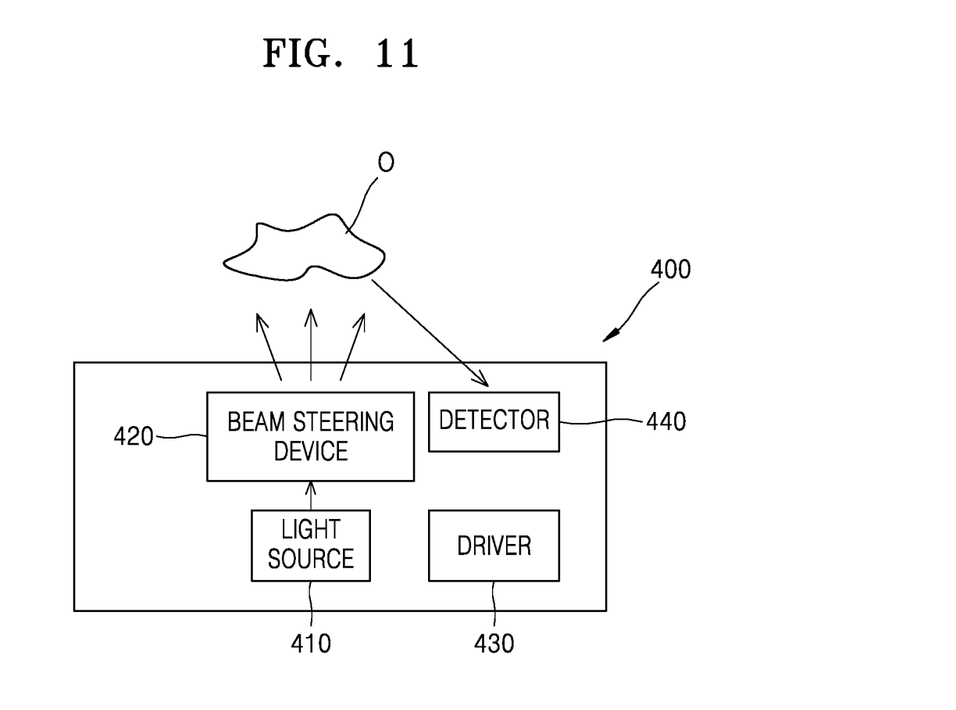
FIG. 11 is a view of a system including a beam steering device according to an exemplary embodiment.

FIG. 11 is a view of a system 400 according to an exemplary embodiment. FIG. 11 illustrates the system 400 using a beam steering device 420 according to an exemplary embodiment.

Referring to FIG. 11, the system 400 according to an exemplary embodiment may include a light source 410 that emits a beam, the beam steering device 420 that steers a beam, a detector 440 that detects a beam reflected by an object O, and a driver 430. The driver 430 may include a driving circuit for driving the light source 410, the beam steering device 420, and the detector 440.

The light source 410 may be, for example, a laser diode or a light-emitting device. However, exemplary embodiments are not limited thereto, and the light source 410 may be any of various other light sources. A beam emitted from the light source 410 is incident on the beam steering device 420. The beam steering device 420 may steer the incident beam to a desired position. Examples of the beam steering device 420 may include the beam steering devices BS, BS1, BS2, BS3, and BS4 according to the above various exemplary embodiments, or any combination thereof. The beam steered by the beam steering device 420 may be emitted to and reflected by the object O, and the detector 440 may detect the reflected beam. Various examples of the system 400 to which the beam steering device 420 may be applied include a depth sensor, a three-dimensional (3D) sensor, and a light detection and ranging (LiDAR). Beams may be steered in a horizontal direction and a vertical direction of the object O by using the beam steering device BS4 having a stacked structure as shown in FIG. 10. Accordingly, a 3D image of the object O may be obtained.

While exemplary embodiments have been described with reference to the figures, it will be understood by one of ordinary skill in the art that various changes in form and details may be made therein without departing from the spirit and scope as defined by the following claims.

What is claimed is:

1. A beam steering device configured to steer a beam incident from a light source towards an object, comprising:
   a waveguide configured to transmit the beam incident from the light source therethrough;
   a cladding layer provided on the waveguide and comprising a material having a refractive index that varies according to a voltage applied thereto;
   an electrode layer comprising at least two electrodes configured to independently apply voltages to at least two portions of the cladding layer to steer the beam to the object; and
   an insulating material provided between the at least two electrodes,
   wherein the electrode layer comprises a first portion configured to apply a first voltage to a first portion of the cladding layer and a second portion configured to apply a second voltage to a second portion of the cladding layer, the first voltage and the second voltage being different,
   wherein a boundary between the first portion and the second portion has a stepped structure based on the first voltage and the second voltage,
   wherein the electrode layer comprises a first electrode of the first portion and a second electrode of the second portion which are on a same surface and the waveguide is configured to operate as a common electrode of the first electrode and the second electrode, and
   wherein the beam propagates parallel to the electrode layer.

2. The beam steering device of claim 1, wherein the at least two electrodes are electrically independent.

3. The beam steering device of claim 1, wherein the cladding layer comprises an electro-optic material.

4. The beam steering device of claim 3, wherein the electro-optic material comprises a liquid crystal, TiN, KTa1-xNbxO3 (KTN), or NbOx.

5. The beam steering device of claim 1, wherein the cladding layer comprises an oxide semiconductor.

6. The beam steering device of claim 5, wherein the oxide semiconductor comprises at least one from among Indium- Tin-Oxide (ITO), Indium-Zinc-Oxide (IZO), Ga—In—Zn-Oxide (GIZO), Al—Zn-Oxide (AZO), Ga—Zn-Oxide (GZO), and ZnO.

7. The beam steering device of claim 1, wherein the waveguide comprises silicon or silicon nitride.

8. The beam steering device of claim 1, wherein the at least two electrodes of the electrode layer comprise a plurality of pixel electrodes that are arranged in a matrix and are electrically independent.

9. The beam steering device of claim 1, wherein the cladding layer comprises a metal oxide semiconductor structure provided along with the electrode layer.

10. The beam steering device of claim 9, wherein the cladding layer comprises a first layer and a second layer, wherein the first layer comprises at least one from among Indium-Tin-Oxide (ITO), Indium-Zinc-Oxide (IZO), Ga—In—Zn-Oxide (GIZO), Al—Zn-Oxide (AZO), Ga—Zn-Oxide (GZO), and ZnO and the second layer comprises any one from among $HfO_2$, $Al_2O_3$, $SiN_x$, and $SiO_2$.

11. The beam steering device of claim 1, wherein the waveguide, the cladding layer, and the electrode layer are repeatedly stacked at least two times.

12. The beam steering device of claim 1, wherein the waveguide is configured to operate as an active prism according to a change in the refractive index of the cladding layer.

13. A system comprising:
a light source;
a beam steering device configured to steer a beam incident from the light source towards an object; and
a detector configured to detect the beam steered by the beam steering device and reflected by the object,
wherein the beam steering device comprises:
  a waveguide configured to transmit the beam therethrough;
  a cladding layer provided on the waveguide and comprising a material having a refractive index that varies according to a voltage applied thereto;
  an electrode layer comprising at least two electrodes configured to independently apply voltages to at least two portions of the cladding layer; and
  an insulating material provided between the at least two electrodes,
wherein the electrode layer comprises a first portion configured to apply a first voltage to a first portion of the cladding layer and a second portion configured to apply a second voltage to a second portion of the cladding layer, the first voltage and the second voltage being different, and
wherein a boundary between the first portion and the second portion has a stepped structure based on the first voltage and the second voltage,
wherein the electrode layer comprises a first electrode of the first portion and a second electrode of the second portion which are on a same surface and the waveguide is configured to operate as a common electrode of the first electrode and the second electrode, and
wherein the beam propagates parallel to the electrode layer.

14. The system of claim 13, wherein the cladding layer comprises an electro-optic material.

15. The system of claim 14, wherein the electro-optic material comprises a liquid crystal, TiN, $KTa_{1-x}Nb_xO_3$ (KTN), or $NbO_x$.

16. The system of claim 13, wherein the cladding layer comprises an oxide semiconductor.

17. The system of claim 13, wherein the at least two electrodes of the electrode layer comprise a plurality of pixel electrodes that are arranged in a matrix and are electrically independent.

18. A beam steering device configured to steer a beam incident from a light source towards an object, comprising:
a waveguide configured to transmit the beam incident from the light source therethrough;
a cladding layer provided on the waveguide and comprising a material having a refractive index that varies according to a voltage applied thereto;
an electrode layer comprising at least two electrodes configured to independently apply voltages to at least two portions of the cladding layer to steer the beam to the object; and
an insulating material provided between the at least two electrodes,
wherein the electrode layer comprises a first portion configured to apply a first voltage to a first portion of the cladding layer and a second portion configured to apply a second voltage to a second portion of the cladding layer, the first voltage and the second voltage being different,
wherein a surface of the first portion and a surface of the second portion that face each other are inclined with respect to a direction of the beam incident from the light source, and
wherein the electrode layer comprises a first electrode of the first portion and a second electrode of the second portion which are on a same surface and the waveguide is configured to operate as a common electrode of the first electrode and the second electrode, and
wherein the beam propagates parallel to the electrode layer.

* * * * *